Nov. 6, 1956 L. A. MacDONALD 2,769,972
METHOD AND APPARATUS FOR DETECTING MOTION
Filed March 15, 1954 2 Sheets-Sheet 2

United States Patent Office 2,769,972
Patented Nov. 6, 1956

2,769,972
METHOD AND APPARATUS FOR DETECTING MOTION

Leslie A. MacDonald, New Hyde Park, N. Y., assignor to American District Telegraph Company, Jersey City, N. J., a corporation of New Jersey Application March 15, 1954, Serial No. 416,350

24 Claims. (Cl. 340—258)

The present invention relates to a method and apparatus for detecting motion and more particularly to a method for establishing a field of radiant energy in a given area and detecting motion in said area by detecting the disturbances in said radiant energy field caused by said motion as well as apparatus for carrying out the same.

Various systems have been proposed for the detection of motion by utilizing the effect of said motion on radiant energy. In accordance with one such system, an enclosure is flooded with radiant energy so as to establish a standing wave pattern therein. Theoretically, a transmitter and receiver are so located relative one to the other that the receiver is normally located at a node of the standing wave pattern. Such a system, which is exemplified, for example, by Miessner Patent 2,071,933 issued February 23, 1937, may be termed a null system for ready identification since in the absence of a disturbance to the standing wave pattern no energy is taken from the field by the receiver. The null system takes advantage of the fact that a disturbance of the standing wave pattern as by movement of a radiant energy reflector will cause a rearrangement of the pattern so that the receiver is no longer at a node, or other constant energy level, and may therefore take energy from the field which may be amplified and fed through a circuit for initiating a desired sequence of events. However, the null system has thus far proven unsatisfactory since in practice it is virtually impossible to establish the conditions necessary to maintain a stable radiant energy standing wave pattern even in a completely enclosed area. This will be readily understood when it is appreciated that either the transmitter or the receiver or both may drift frequencywise so that, with the receiver at a null point for a given frequency or wave length, frequency drift may often result in such a readjustment of the standing wave pattern that the receiver is no longer located at a node. Other disturbances not intended to be detected may also cause a redistribution of the standing wave pattern. These include variations in the atmosphere of the enclosure such as humidity and density changes. Very often the standing wave pattern is disturbed by convection currents in the atmosphere due to a temperature differential between different points as may result from a heat radiator or the like.

It has also been proposed to provide a system which for convenience may be designated as the frequency shift system. In accordance with the frequency shift system, which is exemplified, for example, by Bagno Patent 2,655,645 issued October 13, 1953, an enclosed area is also flooded with radiant energy at a predetermined frequency. A receiver is located in the enclosure to receive, detect and compare the frequencies received. If the frequencies received are the same as that transmitted, then that is indicative of no motion or movement in the enclosed area. On the other hand, if a different frequency from that transmitted is received, then a circuit is actuated to initiate a desired train of events. Here, advantage is taken of the well known Doppler effect, in that objects or things in the path of the energy radiated by the transmitter give rise to reflections which ultimately arrive at the receiver and motion of any one of these reflectors relative to the receiver causes a frequency shift corresponding to the direction and speed of movement. The amplitude or energy level of the new frequency at the receiver will be proportional to the efficiency of the moving thing or object as a reflector of the radiant energy. It will be apparent that while in the null system the receiver should always be located at a node of the standing wave pattern, just the opposite condition is desirable to satisfactory operation of the frequency shift system provided the latter is supervised continuously, i. e., means are provided to cause an alarm upon a drop in the received signal intensity below a predetermined level. In other words, a highly desired attribute of the latter system is that the receiver never be located at a node of the radiant energy so that a drop in radiant energy or received signal strength can be used as an indication of equipment failure. Thus, the efficiency or dependability of a frequency shift system may be evaluated from one aspect in terms of the occurrence of a null point or node at the receiver versus the duration of the period of operation. The importance of avoiding the occurrence of a null point at the receiver may, perhaps, be best brought out by a brief consideration now of one type of installation which may be utilized. A suitable transmitter and receiver may be installed in an area for the detection of motion therein which may be that of an intruder. Movement of the intruder will cause a different frequency to be received at the receiver than that generated by the transmitter. The receiver is usually coupled to an alarm circuit in such fashion that the presence of the intruder is signalled at some remote central station. Of course, a breakdown in the equipment would prevent detection of the intruder and it is therefore necessary that such a failure also give rise to a signal at the central station, which of necessity must be considered as an alarm condition until an investigation is made. Since the occurrence of a null point at the receiver would prevent detection, the apparatus is so designed that such an occurrence also triggers the alarm circuit thereby necessitating investigation from the central station. However, supervision of this character would give rise to an undue number of false alarms if means were not provided to suppress the formation of null points at the receiver.

Various attempts have been made to prevent the occurrence of a null point at the receiver. For example, it has been proposed to link the receiver and transmitter in an oscillatory system which includes the air in the enclosure in which the apparatus is installed so that the frequency transmitted is dependent upon the condition of the air in the space as well as the transmitting and receiving apparatus. It has also been proposed to utilize more than one transmitter, such as two transmitters operating with a fixed frequency difference between them, so as to avoid the occurrence of a null at the receiver. In practice, such arrangements have not only failed to reduce the occurrence of spurious signals, but have actually increased the incidence thereof thereby rendering the systems highly unsatisfactory in operation.

It is therefore a principal object of the invention to provide a method and apparatus for detecting motion by means of which spurious signals are avoided to an enhanced degree. A more specific object is to provide such a method and apparatus in which the frequency developed by the oscillator of the transmitter is varied in predetermined relation to the received signal strength.

A more specific object is to provide such a method and apparatus in which the transmitter and receiver are directly coupled so that when a null point for the transmitted frequency approaches the receiver, the transmitter is automatically shifted frequencywise a small amount to a new frequency sufficiently different from the original frequency that the null point for the original frequency is not a null point for the new frequency.

Another object of the invention is to provide means for limiting the frequency sensitivity range of the receiver so as to maximize sensitivity within the desired range of alarm frequencies.

Another object of the invention is to provide, in a motion detection system of the character contemplated, continuous supervision of the system and particularly continuous supervision of all tubes.

Still another object of the invention is to provide a motion detection system which can be tested at will, locally or at a remote point, and in which the testing produces in the system a response similar to that produced by motion.

A further object of the invention has been to provide a motion detection system in which momentary power failures will not produce alarm indications.

Still another object of the invention is to provide a supervised motion detection system employing a transmitted and received ultrasonic signal in which increases in received average signal strength will not substantially reduce system sensitivity.

Other and further objects, features and advantages of the invention will appear more fully from the following description.

A motion detection system, in accordance with the invention, comprises an oscillator for producing a first alternating current having a given frequency, transmitting means coupled to the oscillator and arranged to convert the alternating current into radiant energy, receiving means arranged to receive radiant energy transmitted by the transmitting means and to convert the received radiant energy into a second alternating current, alarm indicating means, means responsive to modulation components in the second alternating current to produce an alarm signal, means to apply the alarm signal to the alarm indicating means in a sense to cause the latter to produce an alarm indication, means to derive from the second alternating current a supervisory signal proportional in amplitude to the average strength of the received radiant energy, means to apply the supervisory signal to the oscillator in a sense to change the frequency of the first alternating current in response to changes in average strength of the received radiant energy, and means to apply the supervisory signal to the alarm indicating means in a sense to cause the latter to produce an alarm indication in response to a drop in received radiant energy below a predetermined level.

The invention will now be described in greater detail with reference to the appended drawings, which show an illustrative embodiment of the invention, and in which.

Referring now to the drawings, there are shown a transmitting transducer T and a receiving transducer R for converting alternating electrical energy into sound waves and for converting sound waves into alternating electrical energy, respectively. While these transducers may be of any suitable design, they are preferably constructed in accordance with the teachings of the copending patent application of L. A. MacDonald and L. H. Kelly, Serial No. 386,862, filed October 19, 1953, or the teachings of the copending patent application of L. H. Kelly, Serial No. 395,893, filed December 3, 1953.

The transmitting transducer T is energized to produce ultrasonic vibratory energy by passing an alternating electrical current through the coil 10 thereof. The alternating current should have a frequency which is the same as the sound frequency to be transmitted. This frequency should lie within the range of frequencies at which the transducer T is most efficient. A suitable frequency might be, for example, about 21,000 cycles. The alternating current for energizing the transducer T is generated by an oscillator comprising a vacuum tube 11 and a tank circuit including a capacitor 12 and an inductor 13. The capacitor 12 is connected between the anode and cathode of the tube 11, while the inductor 13 is connected in series between the anode of the tube 11 and the source of high voltage direct current for the tube 11. The source of high voltage direct current for the tube 11, as well as for the other tubes, is of conventional design and includes a transformer 14, a rectifier tube 15, and a filter circuit 16. A capacitor 17 and resistor 18 connected between the cathode of tube 11 and ground and a resistor 19 connected between the grid of tube 11 and ground provide the desired feedback between the input and output circuits of the tube 11 to sustain oscillations at the desired frequency selected by the tube 11 grid bias and by the tuning of the tank circuit comprising the capacitor 12 and the inductor 13. The tube 11, which might be, for example, one-half of a 12AY7 double triode, thus provides oscillations of the desired frequency.

The alternating current output of the tube 11 appears across the parallel connected capacitor 17 and resistor 18 and is applied to the grid of a tube 20 through a coupling capacitor 21. The tube 20, in addition to other functions to be discussed hereinafter, serves as a buffer amplifier stage between the oscillator tube 11 and a power amplifier tube 22. The tube 20 might conveniently be the other half of the double triode including the oscillator tube 11. It should be understood that the various tube types mentioned are intended solely for illustration and should not be considered as limiting the invention in any way. The amplified alternating output of the tube 20 is applied to the control grid of the tube 22 through a coupling capacitor 23. The tube 22, which serves as a power amplifier, might be, for example, a beam power tetrode such as the 6AQ5. The amplified output of the tube 22 is applied to the coil 10 of the transmitting transducer T through a transformer 24. The secondary winding of the transformer 24 is preferably tuned to the oscillator frequency by means of parallel connected capacitors 25 and 26. Any suitable transmission line 27 may be provided to interconnect the transformer 24 and the transducer T so that the transducer T may be located remotely from the chassis housing the oscillator 11 and the amplifier 22.

Sound energy transmitted by the transducer T enters the area to be protected. Some of this energy may pass directly to the receiving transducer R but most, if not all, of the transmitted energy picked up by the receiving transducer R will be reflected from objects within the area or from the walls of the area. There will be a tendency for standing wave patterns to be set up within the area and, because of thermal disturbances, air currents and the like, the standing wave pattern will tend to shift and the energy received by the receiving transducer will tend to vary slowly with time. However, so long as the shifts in the standing wave pattern are relatively slow, the energy received by the receiving transducer R will virtually all be at the frequency of the transmitting transducer T. In accordance with the well known Doppler effect, when an object within the protected area moves with appreciable velocity, or when substantial air currents are set up in the area, the energy impinging on the receiving transducer R will have a frequency component differing from the transmitted frequency by an amount dependent upon the character of the motion or disturbance. Generally, the more rapid the motion the greater will be the frequency difference between the transmitted frequency and the shifted frequency component received. The effect of the presence of a shifted frequency component in the received energy is to provide a modulated signal at the receiver. The received energy will then resemble a carrier wave at the transmitter frequency modulated at a relatively slow rate as a result of the Doppler shift. The modulating frequency, depending on the character of the motion, may vary from a few cycles per second to a hundred cycles per second, or more.

The receiving transducer R functions to convert received sound energy into an alternating current having a frequency equal to the received frequency and an amplitude proportional to the amplitude of the received energy. The alternating current produced by the receiving transducer R will have more than one frequency component when the received signal is composed of more than one frequency, i. e., when it is modulated. This will occur when motion of an object or of an air current in the protected area causes a Doppler shift in frequency.

The alternating current output of the transducer R is applied to the primary winding of a transformer 28 through any suitable transmission line 29. The secondary winding of the transformer 28 is connected to the input circuit of an amplifier tube 30 so that the transducer R output is amplified by the tube 30 and appears across the primary winding of a tuned coupling transformer 31 included in the anode circuit of the tube 30. One end of the secondary winding 32 of the transformer 31 is connected to the control grid of an amplifier tube 33 which, together with the tube 30, might conveniently be a 12AY7 double triode. The other end of the winding 32 is coupled to ground through a resistor 34 and through series connected capacitors 35 and 36. The capacitors 35 and 36 together with a resistor 37 are intended to act as a low pass filter, as will be more apparent from the discussion hereinafter. However, the capacitors 35 and 36 effectively shunt any high frequency energy appearing across the resistor 34 to ground, so that only the high frequency, i. e., received carrier or modulated carrier signal, appearing across the secondary winding 32 will be passed to the input circuit of the tube 33.

The amplified high frequency energy output of the tube 33 appears across a choke coil 38. A small portion of the high frequency energy appearing across the choke 38 is applied to the control grid of an amplifier tube 39 through a capacitor 40 acting as a high pass filter. Most of the high frequency energy appearing across the choke 38 is supplied to a high pass filter comprising series connected capacitors 41 and 42 and a resistor 43 connected between the junction of capacitors 41 and 42 and ground. The output of this high pass filter is applied to a rectifier 44 connected between the junction of capacitor 42 and resistor 37 and ground. The half wave rectified output of the rectifier 44 appears across a resistor 45 connected in parallel with the rectifier 44. When the sound energy received by the transducer R contains only one frequency, or substantially only one frequency component, i. e., the unmodulated carrier, only a steady D. C. potential will be produced across the resistor 45 and applied to the low pass filter, including the capacitors 35 and 36 and the resistor 37. When the energy received by the receiving transducer R contains more than one frequency component, i. e., when it is modulated by motion within the protected area, the rectifier 44, acting as a demodulator, will produce across the resistor 45 a low frequency signal representative of the modulation frequency or frequencies. This modulation frequency, which is actually the Doppler frequency, might be of the order of a few cycles per second, or even a larger frequency such as 50 to 100 cycles per second, or more. The modulation frequency will thus depend upon the character of the motion which produced the frequency shift. This low frequency signal appearing across the resistor 45 may be considered the alarm signal since it will only be present in an appreciable amount when an alarm condition exists resulting in a noticeable Doppler frequency shift.

The alarm signal, if any, appearing across resistor 45 passes through the low pass filter comprising the capacitors 35 and 36 and the resistor 37 and is applied to the grid of the tube 33 through the secondary winding 32 of the transformer 31, the winding 32 presenting a very small reactance at this low frequency. The low pass filter also acts to suppress the transmission of any high frequency components in the output of the rectifier 44. The tube 33 thus may receive two separate input signals, one a high frequency signal received from the transducer R, and the other a low frequency alarm signal derived from demodulating the high frequency signal. The high frequency signal will be modulated when an alarm condition exists, but will not be modulated when such a condition does not exist. Thus, in the absence of an alarm the only input to the tube 33 will be a high frequency signal having a frequency equal to that of the transmitting transducer T. As has been explained above, the high frequency amplified output of the tube 33 is divided into two paths, one leading to the rectifier 44 and the other to the control grid of the tube 39. The choke 38 is provided with a center tap which is coupled to ground through a capacitor 46, the choke 38 and the capacitor 46 acting as a low pass filter for the transmission of the demodulated signal, as will be described. It will be evident that only the high frequency voltage developed in one-half of the choke 38 will be applied to the rectifier 44 and through the capacitor 40 to the grid of the tube 39. The high frequency voltage which will be developed across the other one-half of the choke 38 is effectively shunted to ground by the capacitor 46, which, for an operating frequency of about 21,000 cycles, might be, for example, .05 mfd.

The demodulated low frequency amplified output of the tube 33 passes through the upper part of the choke 38 and appears across the parallel combination of capacitor 46 and potentiometer 47. This low frequency voltage is prevented from returning to the rectifier 44 by the high pass filter, including the capacitors 41 and 42. The low pass filter formed by the choke 38 and the capacitor 46 is preferably selected so as to shunt low frequency signals above a given frequency, such as, for example, 100 cycles, to ground. In this way only alarm signals having frequencies within a range of ±100 cycles (or other selected range) of the transmitted frequency can produce an alarm. For a transmitted frequency of 21,000 cycles this would provide an alarm indication for motion producing a received signal component between 20,900 and 21,100 cycles. It has been found that a range of this nature will provide the most desirable results.

The low frequency alarm signal appearing across the potentiometer 47 is applied to the control grid of the tube 39 through a potentiometer 48. The tube 39 thus has applied to it a high frequency signal and a low frequency signal. Both of these signals are amplified by tube 39 and applied to the control grid of a tube 49 through a coupling capacitor 50. It has been found desirable to suppress alarm signals having a frequency below a predetermined value in order to minimize false alarms caused by the motion of small animals such as mice or cats, or by fairly rapid temperature variations and the like. A preferred low limit has been found to be about 30 cycles. To suppress such low frequency components of the alarm signal and to suppress the alarm signal itself when it consists only of such components, a high pass filter comprising a series connected choke coil 51 and capacitor 52 is connected between the grid of tube 49 and ground. This series combination of the choke coil 51 and the capacitor 52 may be selected to bypass to ground all frequencies below the desired low cutoff frequnecy, e. g., 30 cycles. It will be observed that the high pass filter formed by the choke 51 and capacitor 52 and the low pass filter formed by the choke 38 and the capacitor 46 together form a band pass filter adapted to pass to succeeding stages only alarm signal components within a desired range, e. g., 30 to 100 cycles.

An alarm signal within the desired frequency range is amplified by the tube 49 and applied to the primary winding of a transformer 54. The secondary winding of the transformer 54 is connected to a voltage doubler circuit comprising a rectifier 55, a rectifier 56, a capacitor 57 and a capacitor 58. The rectifiers 55 and 56 are so poled that a D. C. potential negative with respect to ground will be produced at the junction of rectifier 55 and capacitor 57. This negative D. C. potential is supplied through a resistor 59 to the shield grid of a thyratron tube 60 in a sense to cut off the latter. It will be evident that when no alarm signal is received the thyratron 60 will remain conductive provided the potentials applied to the other electrodes thereof are such as to cause it to fire.

The high frequency signal amplified by the tube 49 is shunted around the transformer 54 by a capacitor 61 forming a high pass filter. This shunted high frequency signal is rectified by a rectifier 62 yielding a half wave rectified voltage across a resistor 63 in parallel with the rectifier 62. For reasons which will appear later, the high frequency signal amplified by the tube 49 may be termed a supervisory signal so that when this signal is rectified by the rectifier 62 the resultant D. C. voltage across the resistor 63 may be termed the supervisory voltage. This supervisory voltage is applied to a capacitor 64 to charge the latter in a sense such that its ground connected terminal will be positive. The supervisory voltage across the resistor 63 is supplied to the capacitor 64 through a resistor 65 connected in series with a parallel combination of a resistor 66 and a capacitor 67. The resistor 65 and the capacitor 67 serve as a filter to smooth the rectified supervisory voltage. The combination of resistor 65, resistor 66, capacitor 67 and capacitor 64 preferably represents a long time constant charging circuit for the capacitor 64 so that momentary fluctuations of the supervisory voltage across the resistor 63 will not produce an appreciable change in the charge of the capacitor 64. A suitable time constant for this circuit has been found to be about one minute. Thus, only relatively slow changes in high frequency signal level will produce a substantial variation in the charge of the capacitor 64. The negative terminal of the capacitor 64 is connected to the control grid of the oscillator tube 11 through a resistor 68, the resistors 68 and 19 forming a voltage divider circuit. It will be evident that the voltage appearing across the capacitor 64 will serve to bias the grid of the oscillator tube 11. The oscillator tube 11 is included in a Colpitts type oscillator circuit in which the resonant frequency of the circuit is in part dependent upon the input capacity of the oscillator tube. The biasing voltage from the capacitor 64 plays an important part in determining the input capacity of the tube 11 and hence the operating frequency thereof, since the input capacity of this tube is approximately equal to the gain of the tube times the plate to grid capacity, and the gain will be dependent upon the bias.

In a preferred embodiment of the invention, resistors 68 and 19 were given values of 150,000 ohms and 56,000 ohms, respectively, and the tube 11 was adjusted so that a 5 volt change across the capacitor 64 resulted in a frequency shift of about 50 cycles, i. e., 10 cycles per volt. It will be evident that any relatively slow changes in received signal level will cause a change in the voltage across capacitor 64, resulting in a change in frequency of the oscillator 11. Thus, as the received signal strength decreases from the approach of a null condition, the voltage across the capacitor 64 will tend to decrease slowly, thereby decreasing the negative bias on tube 11 and changing the oscillator frequency. However, any change in the oscillator frequency will alter the standing wave pattern and hence will completely readjust the null point location, thereby preventing the received signal strength from dropping below a predetermined value at which an alarm indication would be given. It is not desirable that momentary fluctuations in received signal strength be permitted to shift the oscillator frequency, since this would tend to give rise to an unstable operating condition. The long time constant charge circuit for capacitor 64 requires a relatively long term signal level change before frequency will be changed appreciably.

The voltage across the capacitor 64 also performs another important function. This function consists of cutting off the thyratron 60 when the received signal strength drops below a predetermined level. This drop in signal strength would normally occur only because of equipment failure. It is desirable that equipment failure yield an alarm indication so that supervisory personnel may visit the protected area to correct the failure. Otherwise a considerable period of time in which the equipment had failed might elapse before such failure was determined. The constant check on equipment performance produced by employing the voltage across capacitor 64 to maintain the tube 60 energized may be termed supervision. An important aspect of the invention resides in the provision of this constant supervision and it is primarily the need for such supervision that makes necessary the means for suppressing the formation of null points at the receiver. If supervision were not needed, then a null point at the receiver would be of little significance, since undesired motion in the protected area would shift the standing wave pattern and hence move any null point away from the receiver. While motion occurs within the protected area, the standing wave pattern is constantly in flux.

When the equipment is operating normally, and in the absence of an alarm signal, the thyratron 60 is conductive. The thyratron 60 derives its anode potential from a transformer 70, the primary of which might conveniently be connected to the tube filament voltage winding of the transformer 14. The anode of tube 60 is connected to one end of the secondary winding of the transformer 70 through a coil 71 of a relay AL, an armature 72 and front contact 73 of a relay ACS and a resistor 74. The other end of the secondary winding of transformer 70 is coupled to ground through a capacitor 75 and a potentiometer 76. The secondary winding of the transformer 70 is provided with a tap which is connected to the cathode of tube 60, the cathode of tube 60 also being connected to the negative terminal of capacitor 64. The tap of potentiometer 76 is coupled to the grid of thyratron 60 through a resistor 77. In adjusting the thyratron 60 the potentiometer 76 should be set so that the A. C. voltage supplied to the grid of thyratron 60 from potentiometer 76 is just insufficient to fire the thyratron. Hence the thyratron will not fire until the negative voltage supplied to the cathode thereof (positive voltage to the grid) from capacitor 64 is sufficient, in combination with the A. C. phasing bias from potentiometer 76, to cause the thyratron to fire. It will be evident that the capacitor 64 must have a negative voltage thereacross sufficiently strong at all times to keep the thyratron conductive or the thyratron will cease to operate. Thus, if the received signal strength drops below a critical value at which the voltage across capacitor 64 becomes insufficient to maintain thyratron conduction, such conduction will cease. The actual signal strength required to insure continued conduction of the thyratron may conveniently be adjusted by changing the setting of the tap of potentiometer 76. In a preferred embodiment of the invention a minimum voltage of about one-half volt across capacitor 64 was found to represent a desirable critical value below which an alarm indication should be given to represent a state of equipment failure.

In normal operation the thyratron 60 is rendered conductive by the combined bias voltages from the transformer 70 and the capacitor 64. When an alarm signal is received, as evidenced by a low frequency signal voltage in the secondary winding of transformer 54, a negative bias potential is applied to the shield grid of the thyratron 60 in a sense to cut off the latter. While any suitable cutoff voltage may be employed, it has been found desirable to adjust the circuit so that the thyratron 60 will be cut off with an alarm signal voltage of from 20 to 30 volts between the shield grid and cathode of the thyratron 60. Alarm signal voltages below the critical value at which the thyratron 60 will cut off represent motion factors for which an alarm indication is not desired, e. g., motion of small animals such as mice, or unimportant air movements. It should be observed that certain violent air movements, such as those produced by a fire, will produce an alarm signal of a strength comparable to that which would be produced by an intruder, and hence will provide an alarm indication. Sensitivity of this character is a desirable feature of the invention.

It was explained above that the potential across capacitor 64 aids in causing conduction of the tube 60. As the average received signal strength increases above the critical low value, there will be a tendency for the thyratron 60 to be less sensitive to the alarm signal voltage at its shield grid since a large negative voltage at the cathode will require a large shield grid voltage to produce cutoff. This represents an undesirable decrease in sensitivity and may be overcome by providing a compensating shield grid bias voltage proportional to the average received signal strength. The supervisory signal voltage drop across the resistor 66 may be used for this compensating bias voltage. For this purpose, the resistor 66, which is included in the charging circuit for capacitor 64, is also included in the shield grid-cathode circuit of the thyratron 60. Thus, increases in average signal strength will produce a voltage drop across the resistor 66 proportional to the signal strength and negative with respect to the shield grid. In other words, a signal strength increase tending to make the cathode of thyratron 60 more negative will also tend to make the shield grid thereof more negative and hence will result in little or no change in sensitivity.

The coil 71 of relay AL is included in the anode circuit of thyratron 60, so that the relay AL will be energized so long as the thyratron 60 is conductive. If the thyratron 60 is rendered nonconductive, as by an alarm signal voltage at the shield grid thereof, or a drop in the supervisory voltage across capacitor 64 below the critical value, the relay AL will drop out. This results in an alarm indication which may be reported locally and/or at a central office through appropriate equipment.

In accordance with a further aspect of the invention, a central office connection may be provided as follows. When the relay AL is energized, a normal circuit is completed from a central office battery 80 through a drop 81 which might be a galvanometer relay, a contact 82, an armature 83 of a central office switch 84, a suitable transmission line 85, and armature 86 and front contact 87 of relay AL, a resistor 88, an armature 89 and back contact 90 of a bell switch 91 to ground. When this circuit is complete it will be evident to central office personnel that the protected area is free of undesired intruders or other undesired motion factors and that the equipment is functioning properly. Any break or grounding in this circuit or any failure of the transmitter or receiver circuits will produce an alarm indication. Similarly, any undesired motion within the protected area will produce an alarm signal which will cut off the thyratron 60, thereby de-energizing the relay AL and changing the central office circuit through the armature 86 from front contact 87 to back contact 87′ of relay AL.

When the relay AL drops out, the armature 86 thereof makes with the contact 87′, completing the central office circuit through a low resistance path to ground, including the coil 92 of bell B and armature 89 and contact 90 of the bell switch 91. This change to a low resistance ground circuit coupled with the momentary opening of the central office circuit at the armature 86 causes the drop galvanometer relay 81 to drop, indicating an alarm condition. If desired, a suitable bell or other audible or visual alarm means may be provided at the central office to insure immediate response to the alarm indication by central office personnel. Passage of current through the coil 92 will cause the bell B to ring once. Further ringing of the bell at this time is prevented because armature 93 and back contact 94 of a relay TT are in parallel with armature 89 and contact 90 of switch 91.

It should be understood that all vacuum tubes in the circuit fail safe, i. e., failure of any vacuum tube results in an alarm indication. This is true because supervisory voltage is derived from a point in the circuit following all vacuum tube stages. Similarly, the thyratron 60 will fail safe since extinction thereof will release relay AL. It will be evident that an important feature of the invention resides in the fact that failure of any one or more tubes in the circuit will result in an alarm being given. However, proper maintenance of a protection system of the character described requires periodic testing of the equipment from the central office, since a few operational difficulties may not properly be indicated by a drop in the supervisory voltage and also to insure that proper sensitivity is being maintained. In accordance with a further aspect of the invention, this periodic testing may be achieved with the circuit illustrated. To effect a test, the central station operator should operate the switch 84 so that the armature 83 leaves the contact 82 and makes with a contact 95. The contact 95 is connected to a test battery 96 which might provide, for example, twice the voltage provided by the battery 80. This higher voltage passes through the transmission line 85, the armature 86, the front contact 87, a resistor 97, the coil of the test relay TT, the armature 89 and contact 90 to ground. The coil of relay TT is not energized by the normal voltage supplied by the battery 80 since the resistor 97 is adjusted so that the voltage supplied by the battery 80 will be insufficient to operate relay TT. The higher voltage supplied by the battery 96 will operate relay TT.

Operation of relay TT opens the armature 93 and contact 94 so that an artificial alarm condition producing denergization of relay AL will cause the bell B to ring. Ringing of the bell B is produced by current flowing from the battery 96 through the contact 95, armature 83, armature 86, back contact 87′ of relay AL, coil 92, armature 89 and contact 90. As soon as the armature 89 is attracted toward the gong of bell B, the energizing circuit for coil 92 is opened, permitting the armature 89 to return to contact 90, whereby ringing is prolonged. Relay TT is held operated for a short time after release of relay AL by a capacitor 98 connected across the coil thereof making relay TT slow-to-release so that contact 94 and armature 93 thereof will not short out the bell contacts for a few seconds.

The artificial alarm signal condition which causes the relay AL to release upon operation of the switch 84 is effected by means of a circuit including front contact 99 and armature 93 of relay TT.

When relay TT is energized, as described, armature 93 makes with front contact 99 connecting a conductor 100 to ground. The other end of conductor 100 is connected to a neon lamp 101 included in a relaxation oscillator circuit, including resistors 102 and 103 which are connected in series between the other terminal of the neon lamp and a filter circuit 104 connected to the positive D. C. terminal of the high voltage rectifier 15. The relaxation oscillator circuit also includes series connected capacitors 105 and 106 connected between the neon lamp 101 and ground. A resistor 107 is connected between ground and the junction of resistors 102 and 103. A potentiometer 108 is connected across capacitor 106 and the tap of potentiometer 108 is coupled to the grid of tube 20 through a resistor 109. A bypass capacitor 110 is connected between the tap of potentiometer 108 and ground.

Before the relay TT is operated, applying ground potential to conductor 100, capacitors 105 and 106 are charged up to a potential determined by the positive voltage output of filter 104 and the resistance of resistors 103 and 107 acting as a charging circuit for these capacitors. The capacitors might be charged, for example, to a combined voltage of 100 volts. When ground potential is applied to conductor 100 upon operation of relay TT or by closing of a manual test switch TS, the neon lamp fires, causing the capacitors to discharge. When the charge has decreased to a value at which the neon lamp cannot be maintained excited, the lamp goes out and charging of the capacitors again takes place. The circuit thus oscillates at a frequency determined primarily by the charging and discharging time constants of the capacitors 105 and 106. This frequence may be adjusted to any value within the range determined by the band pass filter which limits the low frequency demodulated signal applied to the grip of tube 49. In general, it will be desirable to select a frequency adjacent the low end of this range, for example, 35 cycles per second. The relaxation oscillator output is developed across potentiometer 108, and is applied to the grip of tube 20 through the resistor 109 to modulate the tube 20 at the relaxation oscillator frequency. In this way the carrier signal generated in oscillator tube 11 is modulated at a low frequency in the tube 20 and the modulated carrier is amplified by the power amplifier 22 and transmitted by the transmitting transducer T. The signal arriving at the receiving transducer R is the same as would be received under normal conditions with an object moving in the room at such speed and under such conditions as to provide a modulating frequency of 35 cycles per second or other relaxation oscillator frequency. The modulation will produce an alarm signal, as described previously. This alarm signal will cause the relay AL to be released, thereby ringing the bell B and providing an indication at the protected premises that the alarm system is operative. The bell will ring for only a short time, e. g., two or three seconds, depending upon the release time of the relay TT, since when relay TT releases, contact 94 and armature 93 of relay TT short out armature 89 and contact 90 of the bell switch 91. The successive opening and closing of the bell switch 91 will open and close the central office circuit so that proper operation of the system will be observable at the central office.

By adjusting the tap of potentiometer 108 so that the modulation of the carrier produced by the relaxation oscillator will represent approximately the minimum detectable alarm condition, a satisfactory test result will indicate that the unit sensitivity is at least as great as necessary for adequate protection. In initially adjusting the equipment, modulation of the tube 20 at this low level will pemit proper adjustment of the potentiometer 47, which acts as a sensitivity control because the low frequency signal input to the amplifier tube 39 is derived therefrom. If an unsatisfactory test is noted, i. e., the bell B does not operate upon actuation of the relaxation oscillator, the central office will be informed that there is a possibility that the unit sensitivity is too low. The unit sensitivity might be too low because of a change in the capacity of one of the coupling capacitors, or, which is more likely, because of a radical change in the character or spacing of objects in the protected area. For example, a coat or other garment hung over the transmitting transducer might allow sufficient signal to pass through to keep the thyratron 60 conductive, but might so decrease the sensitivity of the system that motion might not be detected. Such a condition would be immediately obvious to central office personnel in a periodic test. It is contemplated that such a test would be made whenever the equipment were turned on at the commencement of a protected period, such as a night or weekend.

Figure 1:
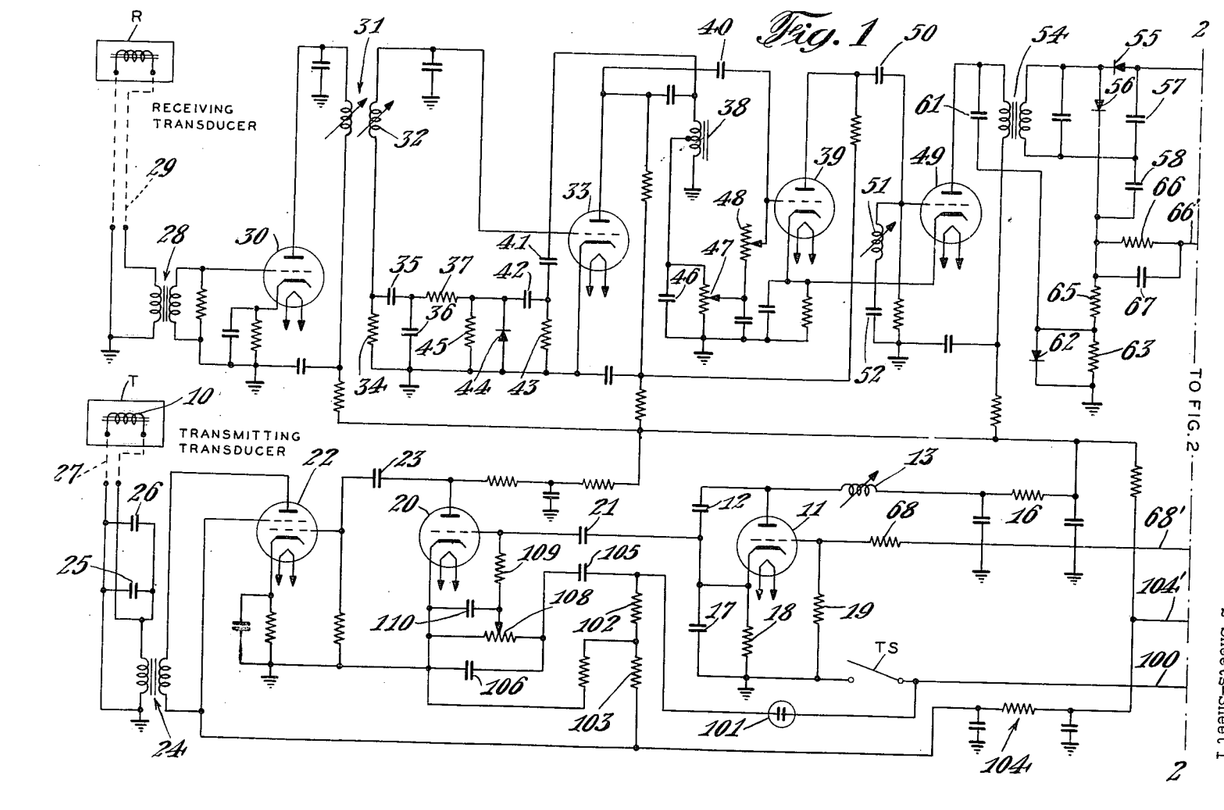
Fig. 1 and Fig. 2, when joined along the lines 2—2, show a schematic wiring diagram of an ultrasonic motion detection system in accordance with the invention.
Figures 2, 3:
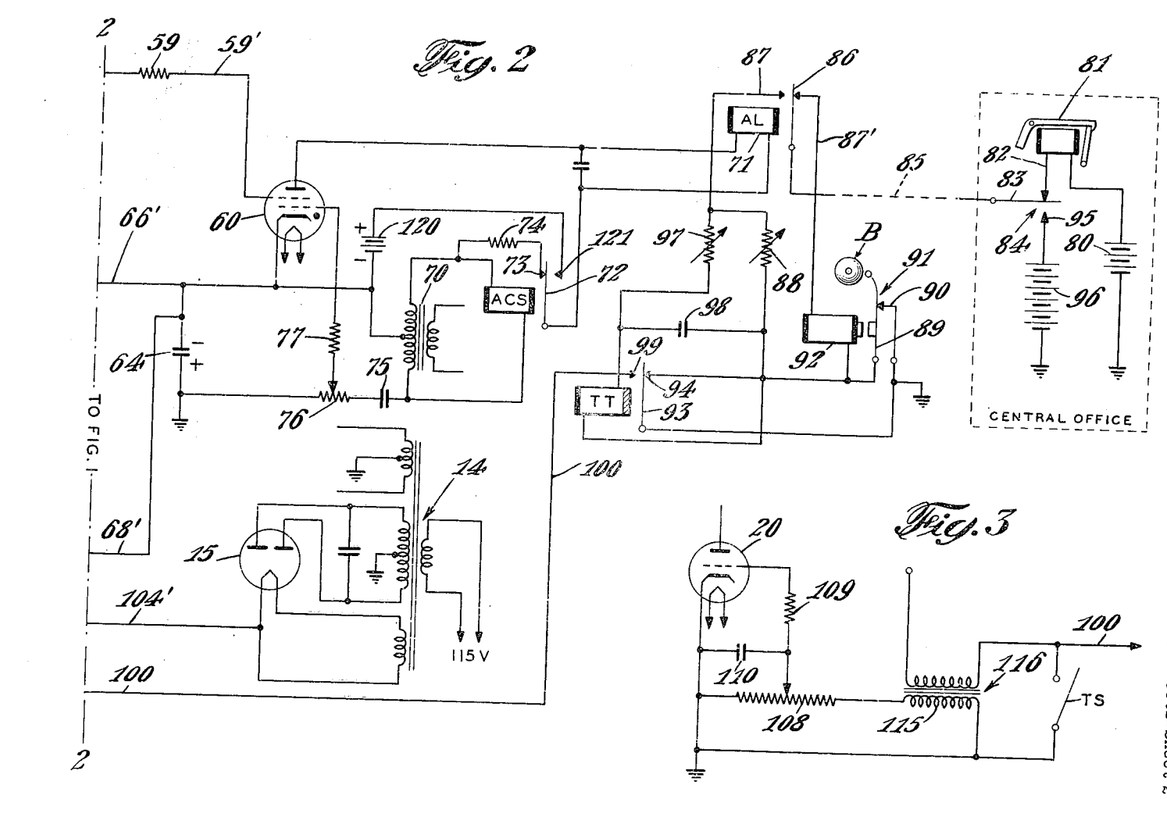
Fig. 3 illustrates a modification of a portion of the circuit of Fig. 1.

Modulation of the tube 20 with a low frequency signal may be achieved by other convenient means. For example, the tube 20 might be modulated with a 60 cycle signal derived from the power transformer 14 or directly from the power line. A suitable modulating circuit is shown in Fig. 3, in which the tube 20 would be connected in exactly the same way as shown in Fig. 1. Potentiometer 108, capacitor 110 and resistor 109 are connected in the same way and perform the same functions indicated in connection with Fig. 1. However, potentiometer 108 has developed thereacross the 60 cycle modulating potential by connecting this potentiometer in series with a secondary winding 115 of a transformer 116. One terminal of the primary winding of the transformer 116 should be connected to the high side of a source of 60 cycle power. The other terminal of the primary winding of transformer 116 is connected to ground through conductor 100. As in the case of Figs. 1 and 2, application of ground potential to conductor 100 is effected when relay TT is energized. The local test switch TS may also be provided for effecting ground connection of conductor 100. When the conductor 100 is grounded, a 60 cycle voltage will be developed across potentiometer 108 which will modulate the carrier signal applied to tube 20 from the oscillator 11. It will be evident that a variety of other sources of modulating potential may be used to secure the desired modulation. In order properly to transmit the modulated carrier signal, the transducer T should have a very high Q.

In order to minimize false alarms, it is desirable that a protection system of the character described be rendered insensitive to momentary power failures. In order to achieve this insensitivity to momentary power failures there is provided a battery 120 having its negative terminal connected to the cathode of thyratron 60 and its positive terminal connected to back contact 121 of relay ACS. The coil of relay ACS is connected in series with the secondary winding of transformer 70 so that, when the main power supply is operative, relay ACS will be energized and the armature 72 thereof will make with its front contact 73. However, when the AC power fails, relay ACS will release and armature 72 will make with front contact 121, connecting the battery 120 between the cathode and anode of thyratron 60. Accordingly, the thyratron 60 will remain conductive during the short interval of time, usually about 5 seconds, during which the cathode of thyratron 60 remains warm enough to emit electrons. Such continuing conduction of thyratron 60 will cause relay AL to remain energized and hence will suppress the transmission of an alarm indication for a few seconds after the power fails. If the power failure continues for more than the cooling time of the thyratron cathode, an alarm indication will be given in the usual way. However, if the power comes on within this short interval, normal operation of the circuit will be restored by energization of relay ACS. Since momentary power failures having a duration of less than about 5 seconds represent the most common types of power failure, it will be evident that the illustrated circuit will materially reduce the number of alarms resulting from power failures. Where the power goes on again after a short interval of time, a transmitted alarm may be considered a false alarm since no serious absence of protection has existed. An extended power failure, on the other hand, may represent a serious unprotected interval, which should be treated as a true alarm condition.

The reference numerals 59', 66', 68', 104' and 100 have been applied to conductors appearing in both Figs. 1 and 2.

While the invention has been described in connection with a specific embodiment thereof, various modifications of the apparatus and method will occur to those skilled in the art without departing from the spirit and scope of the invention as set forth in the appended claims. For example, while the invention has been described in connection with sound energy and particularly in connection with ultrasonic sound, the principles of the invention are applicable to a motion detection system employing other types of radiant energy such as the high frequency electromagnetic radiations of the type disclosed in Lindsay et al. Patent 2,247,246 issued June 24, 1941. Furthermore, the invention is not restricted to detecting motion in an enclosed space such as a room, but is useful in detecting motion in non-enclosed areas.

What is claimed is:

1. A motion detection system, comprising an oscillator for producing a first alternating current having a given frequency, transmitting means coupled to said oscillator and arranged to convert said alternating current into radiant energy, receiving means arranged to receive radiant energy transmitted by said transmitting means and to convert said received radiant energy into a second alternating current, alarm indicating means, means responsive to modulation components in said second alternating current to produce an alarm signal, means to apply said alarm signal to said alarm indicating means in a sense to cause the latter to produce an alarm indication, means to derive from said second alternating current a supervisory signal proportional in amplitude to the strength of the received radiant energy, means to apply said supervisory signal to said oscillator in a sense to change the frequency of the first alternating current in response to changes in strength of the received radiant energy, and means to apply said supervisory signal to said alarm indicating means in a sense to cause the latter to produce an alarm indication in response to a drop in received radiant energy below a predetermined level.

2. A motion detection system, comprising an oscillator for producing a first alternating current having a given frequency, transmitting means coupled to said oscillator and arranged to convert said alternating current into radiant energy, receiving means arranged to receive radiant energy transmitted by said transmitting means and to convert said received radiant energy into a second alternating current, alarm indicating means, means responsive to modulation components in said second alternating current to produce an alarm signal, means to apply said alarm signal to said alarm indicating means in a sense to cause the latter to produce an alarm indication, means to derive from said second alternating current a supervisory signal proportional in amplitude to the average strength of the received radiant energy, means to apply said supervisory signal to said oscillator in a sense to change the frequency of the first alternating current in response to changes in average strength of the received radiant energy, and means to apply said supervisory signal to said alarm indicating means in a sense to cause the latter to produce an alarm indication in response to a drop in average received radiant energy below a predetermined level.

3. A motion detection system, comprising an oscillator for producing a first alternating current having a given frequency, transmitting means coupled to said oscillator and arranged to convert said alternating current into radiant energy, receiving means arranged to receive radiant energy transmitted by said transmitting means and to convert said received radiant energy into a second alternating current, alarm indicating means, means responsive only to modulation components within a given frequency range in said second alternating current to produce an alarm signal, means to apply said alarm signal to said alarm indicating means in a sense to cause the latter to produce an alarm indication, means to derive from said second alternating current a supervisory signal proportional in amplitude to the average strength of the received radiant energy, means to apply said supervisory signal to said oscillator in a sense to change the frequency of the first alternating current in response to changes in average strength of the received radiant energy, and means to apply said supervisory signal to said alarm indicating means in a sense to cause the latter to produce an alarm indication in response to a drop in average received radiant energy below a predetermined level.

4. A motion detection system, comprising an oscillator for producing a first alternating current having a given frequency, transmitting means coupled to said oscillator and arranged to convert said alternating current into radiant energy, receiving means arranged to receive radiant energy transmitted by said transmitting means and to convert said received radiant energy into a second alternating current, alarm indicating means, means responsive only to modulation components within a given frequency range in said second alternating current to produce an alarm signal, means to apply said alarm signal to said alarm indicating means in a sense to cause the latter to produce an alarm indication, means to derive from said second alternating current a supervisory signal proportional in amplitude to the average strength of the received radiant energy, means to apply said supervisory signal to said oscillator in a sense to change the frequency of the first alternating current in response to changes in average strength of the received radiant energy, means to apply said supervisory signal to said alarm indicating means in a sense to cause the latter to produce an alarm indication in response to a drop in average received radiant energy below a predetermined level, and means selectively to modulate said first alternating current with a frequency in said given range thereby artificially to produce an alarm signal.

5. A motion detection system, comprising an oscillator for producing a first alternating current having a given frequency, transmitting transducer means coupled to said oscillator and arranged to convert said alternating current into ultrasonic energy at said given frequency, receiving transducer means arranged to receive ultrasonic energy transmitted by said transmitting transducer means and to convert said received ultrasonic energy into a second alternating current, alarm indicating means, means responsive to modulation components in said second alternating current to produce an alarm signal, means to apply said alarm signal to said alarm indicating means in a sense to cause the latter to produce an alarm indication, means to derive from said second alternating current a supervisory signal proportional in amplitude to the average strength of the received ultrasonic energy, means to apply said supervisory signal to said oscillator in a sense to change the frequency of the first alternating current in response to changes in average strength of the received radiant energy, and means to apply said supervisory signal to said alarm indicating means in a sense to cause the latter to produce an alarm indication in response to a drop in average received ultrasonic energy below a predetermined level.

6. A motion detection system, comprising an oscillator for producing a first alternating current having a given frequency, transmitting means coupled to said oscillator and arranged to convert said first alternating current into radiant energy, receiving means arranged to receive radiant energy transmitted by said transmitting means and to convert said received radiant energy into a second alternating current, alarm indicating means, said last mentioned means including an alarm device and a discharge tube arranged, when non-conductive, to actuate said alarm device, means responsive to modulation components in said second alternating current to produce an alarm signal, means to apply said alarm signal to said discharge tube in a sense to cause the latter to become non-conductive, means to derive from said second alternating current a supervisory signal proportional in amplitude to the average strength of the received radiant energy, means to apply said supervisory signal to said oscillator in a sense to change the frequency of the first alternating current in response to changes in average strength of the received radiant energy, and means to apply said supervisory signal to said discharge tube in a sense to cause the latter to conduct thereby to produce an alarm indication in response to a drop in average received radiant energy below a predetermined level.

7. A motion detection system, comprising an oscillator for producing a first alternating current having a given frequency, transmitting means coupled to said oscillator and arranged to convert said first alternating current into radiant energy, receiving means arranged to receive radiant energy transmitted by said transmitting means and to convert said received radiant energy into a second alternating current, alarm indicating means including a thyratron and an alarm registering circuit coupled to said thyratron and arranged to register an alarm upon assumption of a non-conductive condition by said thyratron, means responsive to modulation components in said second alternating current to produce an alarm signal, means to apply said alarm signal to said thyratron in a sense to cause the latter to cease conduction, circuit means to apply operating potentials to said thyratron tending, but not sufficient, to cause said thyratron to conduct, means to derive from said second alternating current a supervisory potential proportional in amplitude to the average strength of the received radiant energy, means to apply said supervisory potential to said oscillator in a sense to change the frequency of the first alternating current in response to changes in average strength of the received radiant energy, and means to apply said supervisory potential to said thyratron in a sense to aid said circuit means thereby to cause said thyratron to conduct when the average received radiant energy exceeds a predetermined level.

8. A motion detection system, comprising an oscillator for producing a first alternating current having a given frequency, transmitting means coupled to said oscillator and arranged to convert said first alternating current into radiant energy, receiving means arranged to receive radiant energy transmitted by said transmitting means and to convert said received radiant energy into a second alternating current, alarm indicating means including a thyratron having a control grid and a shield grid and an alarm registering circuit coupled to the anode of said thyratron and arranged to register an alarm upon assumption of a non-conductive condition by said thyratron, means responsive to modulation components in said second alternating current to produce an alarm signal, means to apply said alarm signal to the shield grid of said thyratron in a sense to cause the latter to cease conduction, circuit means to apply an operating potential to the control grid-cathode circuit of said thyratron tending, but not sufficient, to cause said thyratron to conduct, means to derive from said second alternating current a supervisory potential proportional in amplitude to the average strength of the received radiant energy, means to apply said supervisory potential to said oscillator in a sense to change the frequency of the first alternating current in response to changes in average strength of the received radiant energy, and means to apply said supervisory potential to the control grid-cathode circuit of said thyratron in a sense to aid said operating potential to cause said thyratron to conduct whereby a drop in average received radiant energy below a predetermined level will cause said thyratron to become non-conductive.

9. A motion detection system as set forth in claim 8 in which the supervisory potential is developed across a capacitor, said capacitor being included in a charging circuit having a time constant of at least one minute.

10. A motion detection system, comprising an oscillator for producing a first alternating current having a given frequency, transmitting means coupled to said oscillator and arranged to convert said first alternating current into radiant energy, receiving means arranged to receive radiant energy transmitted by said transmitting means and to convert said received radiant energy into a second alternating current, alarm indicating means, means responsive to modulation components in said second alternating current to produce an alarm signal, means to apply said alarm signal to said alarm indicating means in a sense to cause the latter to produce an alarm indication, means to derive from said second alternating current a first supervisory potential proportional in amplitude to the average strength of the received radiant energy and to apply said first supervisory potential to said oscillator in a sense to change the frequency of the first alternating current in response to changes in average strength of the received radiant energy, and means to derive from said second alternating current a second supervisory potential proportional in amplitude to the average strength of the received radiant energy and to apply said second supervisory potential to said alarm indicating means in a sense to cause the latter to produce an alarm indication in response to a drop in average received radiant energy below a predetermined level.

11. A motion detection system, comprising an oscillator for producing a first alternating current having a given frequency, an amplifier coupled to said oscillator for amplifying said first alternating current, transmitting means coupled to said amplifier and arranged to convert said amplified first alternating current into radiant energy, receiving means arranged to receive radiant energy transmitted by said transmitting means and to convert said received radiant energy into a second alternating current, alarm indicating means, means responsive to modulation components within a given frequency range in said second alternating current to produce an alarm signal, means to apply said alarm signal to said alarm indicating means in a sense to cause the latter to produce an alarm indication, means to derive from said second alternating current a supervisory signal proportional in amplitude to the average strength of the received radiant energy, means to apply said supervisory signal to said oscillator in a sense to change the frequency of the first alternating current in response to changes in average strength of the received radiant energy, means to apply said supervisory signal to said alarm indicating means in a sense to cause the latter to produce an alarm indication in response to a drop in average received radiant energy below a predetermined level, a source of alternating potential within said given frequency range, and means selectively to apply said alternating potential to said amplifier thereby to modulate said first alternating current and selectively to energize said alarm indicating means.

12. A motion detection system employing a plurality of electron discharge tubes and comprising an oscillator for producing a first alternating current having a given frequency, transmitting means coupled to said oscillator and arranged to convert said first alternating current into radiant energy, receiving means arranged to receive radiant energy transmitted by said transmitting means and to convert said received radiant energy into a second alternating current, alarm indicating means, means responsive to modulation components in said second alternating current to produce an alarm signal, means to apply said alarm signal to said alarm indicating means in a sense to cause the latter to produce an alarm indication, means to derive from said second alternating current a supervisory potential proportional in amplitude to the average strength of the received radiant energy, means to apply said supervisory potential to said oscillator in a sense to change the frequency of the first alternating current in response to changes in average strength of the received radiant energy, and means to apply said supervisory potential to said alarm indicating means in a sense to cause the latter to produce an alarm indication in response to a drop in received radiant energy below a predetermined level, said supervisory potential deriving means being located in the circuit of said system with respect to said electron discharge tubes so that failure of any one or more of said tubes will cause a drop in supervisory potential to produce an alarm indication, said alarm indicating means being constructed and arranged to yield an alarm indication upon failure thereof.

13. A motion detection system, comprising an oscillator for producing a first alternating current having a given frequency, transmitting means coupled to said oscillator and arranged to convert said first alternating current into radiant energy, receiving means arranged to receive radiant energy transmitted by said transmitting means and to convert said received radiant energy into a second alternating current, alarm indicating means including a thyratron and an alarm indicating device coupled to the anode of said thyratron and arranged to provide an alarm indication upon cessation of conduction by said thyratron, means responsive to modulation components in said second alternating current to produce an alarm signal, means to apply said alarm signal to said thyratron in a sense to cause the latter to cease conducting, means to derive from said second alternating current a supervisory potential proportional in amplitude to the average strength of the received radiant energy, means to apply said supervisory potential to said oscillator in a sense to change the frequency of the first alternating current in response to changes in average strength of the received radiant energy, means to apply said supervisory potential to said thyratron in a sense to cause the latter to conduct except upon a drop in average received radiant energy below a predetermined level, a normal source of anode potential for said thyratron, an auxiliary source of anode potential for said thyratron, and means responsive to a failure of said normal source of power to connect said auxiliary source of power to the anode of said thyratron whereby conduction of the latter will continue for a time interval depending on the cooling time of the thyratron cathode.

14. A motion detection system for transmitting to a remote station an alarm indication in response to undesired motion within a given area, comprising an oscillator for producing a first alternating current having a given frequency, transmitting means coupled to said oscillator and arranged to convert said first alternating current into radiant energy and substantially to fill said area with said radiant energy, receiving means arranged to receive radiant energy transmitted by said transmitting means and to convert said received radiant energy into a second alternating current, alarm indicating means including a connection to said remote station, means responsive to modulation components in said second alternating current to produce an alarm signal, means to apply said alarm signal to said alarm indicating means in a sense to cause the latter to produce an alarm indication at said remote station, means to derive from said second alternating current a supervisory signal proportional in amplitude to the average strength of the received radiant energy, means to apply said supervisory signal to said oscillator in a sense to change the frequency of the first alternating current in response to changes in average strength of the received radiant energy, means to apply said supervisory signal to said alarm indicating means in a sense to cause the latter to produce an alarm indication at said remote station in response to a drop in average received radiant energy below a predetermined level, means selectively to modulate said first alternating current thereby artificially to produce an alarm signal, and means controllable from said remote station selectively to energize said modulating means.

15. A motion detection system for detecting motion within an area, comprising an oscillator circuit for producing an alternating current having a given high frequency, said oscillator circuit including a tube and having a natural frequency dependent upon the grid-cathode bias of said tube, a transmitting transducer coupled to said oscillator circuit for converting said first alternating current into radiant energy, a receiving transducer arranged to receive radiant energy transmitted by said transmitting transducer and for converting said received radiant energy into a second alternating current, a first amplifier tube, a transformer having a primary winding coupled to said receiving transducer and a secondary winding coupled to the input circuit of said first amplifier tube, a first low-pass filter coupled to the secondary winding of said transformer, demodulating means coupled to said first low-pass filter, a first high-pass filter intercoupling said demodulating means and the output circuit of said first amplifier tube, said first high-pass filter being adapted to pass high frequencies in the range of said given frequency to said demodulating means, said demodulating means being adapted to produce a low frequency alarm signal proportional to modulation components in said second alternating current, said first low-pass filter being adapted to pass said alarm signal to the input circuit of said first amplifier tube through the secondary winding of said transformer and to suppress the direct transfer of high frequency energy from the secondary winding of said transformer to said demodulating means, a second amplifier tube, means including a second high-pass filter for intercoupling the output circuit of the first amplifier tube and the input circuit of the second amplifier tube, band-pass filter means intercoupling the output circuit of the first amplifier tube and the input circut of the second amplifier tube, said band-pass filter means being adapted to pass substantially only alarm signal frequencies within a predetermined range, a thyratron tube, first rectifier means intercoupling the output circuit of said second amplifier tube and the shield grid of said thyratron to apply a voltage proportional to said alarm potential to the latter in a sense to cut off said thyratron, a capacitor, second rectifier means coupled to said capacitor, circuit means intercoupling the output circuit of said second amplifier tube and said second rectifier means thereby to charge said capacitor by an amount proportional to the average radiant energy received by said receiving transducer, means for suppressing application of high frequency energy to said first rectifier means, means to apply at least a portion of the voltage developed across said capacitor to the input circuit of said oscillator tube thereby to vary said given frequency in response to changes in average received radiant energy, means to render said thyratron normally conductive, said last mentioned means including connections from said capacitor whereby a drop in the charge of said capacitor below a predetermined level will cut off said thyratron, and alarm indicating means coupled to said thyratron and arranged to operate upon cessation of conduction of the latter.

16. A motion detection system for detecting motion within an area, comprising an oscillator circuit for producing an alternating current having a given high frequency, said oscillator circuit including a tube and having a natural frequency dependent upon the grid-cathode bias of said tube, a first amplifier tube arranged to amplify said first alternating current, a transmitting transducer coupled to said first amplifier tube for converting said first alternating current into radiant energy, a receiving transducer arranged to receive radiant energy transmitted by said transmitting transducer and for converting said received radiant energy into a second alternating current, a second amplifier tube, a transformer having a primary winding coupled to said receiving transducer and a secondary winding coupled to the input circuit of said second amplifier tube, a first low-pass filter coupled to the secondary winding of said transformer, demodulating means coupled to said first low-pass filter, a first high-pass filter intercoupling said demodulating means and the output circuit of said second amplifier tube, said first high-pass filter being adapted to pass high frequencies in the range of said given frequency to said demodulating means, said demodulating means being adapted to produce a low frequency alarm signal proportional to modulation components in said second alternating current, said first low-pass filter being adapted to pass said alarm signal to the input circuit of said second amplifier tube through the secondary winding of said transformer and to suppress the direct transfer of high frequency energy from the secondary winding of said transformer to said demodulating means, a third amplifier tube, means including a second high-pass filter for intercoupling the output circuit of the second amplifier tube and the input circuit of the third amplifier tube, band-pass filter means intercoupling the output circuit of the second amplifier tube and the input circuit of the third amplifier tube, said band-pass filter means being adapted to pass substantially only alarm signal frequencies within a predetermined range, a thyratron tube, first rectifier means intercoupling the output circuit of said third amplifier tube and the shield grid of said thyratron to apply a voltage proportional to said alarm potential to the latter in a sense to cut off said thyratron, a capacitor, second rectifier means coupled to said capacitor, circuit means intercoupling the output circuit of said third amplifier tube and said second rectifier means thereby to charge said capacitor by an amount proportional to the average radiant energy received by said receiving transducer, means for suppressing application of high frequency energy to said first rectifier means, means to apply at least a portion of the voltage developed across said capacitor to the input circuit of said oscillator tube thereby to vary said given frequency in response to changes in average received radiant energy, means to render said thyratron normally conductive, said last mentioned means including connections from said capacitor whereby a drop in the charge of said capacitor below a predetermined level will cut off said thyratron, alarm indicating means coupled to said thyratron and arranged to operate only upon cessation of conduction of the latter, a source of a third alternating current having a frequency lying within said predetermined range, and switch means selectively to apply said third alternating current to said first amplifier tube to modulate said first alternating current thereby artificially to produce an alarm signal.

17. A motion detection system as set forth in claim 16 for indicating motion alarm to a remote station and in which the switch means may be operated from the remote station, means being provided in said system for indicating to said remote station the achievement of a successful artificial alarm.

18. A motion detection system, comprising an oscillator for producing a first alternating current having a given frequency, transmitting means coupled to said oscillator and arranged to convert said first alternating current into radiant energy, receiving means arranged to receive radiant energy transmitted by said transmitting means and to convert said received radiant energy into a second alternating current, alarm indicating means including a thyratron having a control grid and a shield grid and an alarm registering circuit coupled to the anode of said thyratron and arranged to register an alarm upon assumption of a non-conductive condition by said thyratron, means responsive to modulation components in said second alternating current to produce an alarm signal, means to apply said alarm signal to the shield grid of said thyratron in a sense to cause the latter to cease conduction, circuit means to apply an operating potential to the control grid-cathode circuit of said thyratron tending, but not sufficient, to cause said thyratron to conduct, means to derive from said second alternating current a supervisory potential proportional in amplitude to the average strength of the received radiant energy, means to apply said supervisory potential to said oscillator in a sense to change the frequency of the first alternating current in response to changes in average strength of the received radiant energy, means to apply said supervisory potential to the control grid-cathode circuit of said thyratron in a sense to aid said operating potential to cause said thyratron to conduct whereby a drop in average received radiant energy below a predetermined level will cause said thyratron to become non-conductive, means to derive from said second alternating current a direct voltage proportional to said supervisory potential, and means to apply said direct voltage to the shield grid-cathode circuit of said thyratron in a sense to aid said cathode circuit of said thyratron whereby increases in average received radiant energy tending to render said thyratron insensitive to alarm signals will be compensated.

19. In a motion detection system, a thyratron tube arranged to be cut off by an alarm signal produced in said system in response to motion within a protected area thereby to produce an alarm indication, a normal source of alternating current anode potential for said thyratron, an auxiliary source of direct current anode potential for said thyratron, said auxiliary source being independent of said alternating current source so that failure of the former will not result in failure of the latter, and switch means for normally connecting said normal source to the anode of said thyratron, said switch means including a relay coil arranged to be energized by said normal source, first contacts closed when said relay coil is energized for interconnecting said normal source and said thyratron anode and second contacts closed when said relay coil is de-energized for interconnecting said auxiliary source and said thyratron anode whereby momentary failures of said normal source lasting for a time less than the cooling time of the thyratron cathode will not produce an alarm indication.

20. In a motion detection system of the type in which an alternating current is converted into radiant energy which is transmitted throughout an area to be protected and in which a portion of the radiant energy within the area is received and converted into a second alternating current, modulation components in the second alternating current representing motion within the protected area, said modulation components being employed, when present, to provide an alarm indication; the combination comprising an oscillator circuit for producing said first alternating current, means selectively to modulate said first alternating current so that modulation components will appear in the received radiant energy to simulate an alarm condition, a remote station connection for said system, a relay coil coupled to said connection, said relay coil being insensitive to normal operating currents in said connection but being energized in response to a test current transmitted over said connection, first switch means operated by said relay coil for passing said normal operating currents when said relay coil is de-energized, second switch means operated by said relay coil when the latter is energized for energizing said modulating means, and means responsive to a successful simulated alarm condition to transmit a successful test signal to said remote station through said connection.

21. The method of testing an intruder detection system, said system comprising means for generating a first alternating current having a given frequency, means for converting said first alternating current into radiant energy and transmitting said radiant energy throughout a space to be protected, means for receiving a portion of the radiant energy in said area and converting said portion into a second alternating current, and means responsive to modulation components in said second alternating current to produce an alarm indication; said testing method comprising selectively generating a third alternating current, modulating said first alternating current with said third alternating current thereby artificially to produce modulation components in said radiant energy, and using said modulation components to produce an alarm indication.

22. The method of supervising an intruder detection system, said system comprising means for generating a first alternating current having a given frequency, means for converting said first alternating current into radiant energy and transmitting said radiant energy throughout a space to be protected, means for receiving a portion of the radiant energy in said area and converting said portion into a second alternating current, and means responsive to modulation components in said second alternating current to produce an alarm indication; said supervising method comprising deriving from said second alternating current a potential proportional to the average value of the received radiant energy, utilizing a decrease in amplitude of said potential below a predetermined value to produce an alarm indication, and varying the frequency of said first alternating current in accordance with changes in the amplitude of said potential in a sense to render the amplitude of said potential independent of the standing wave pattern in said space.

23. In a motion detection system of the type in which an alternating current is converted into radiant energy which is transmitted throughout an area to be protected and in which a portion of the radiant energy within the area is received and converted into a second alternating current, modulation components in the second alternating current representing motion within the protected area, said modulation components being employed, when present, to provide an alarm indication, the combination comprising a first oscillator circuit for producing said first alternating current, a second oscillator circuit, and means selectively to mix the oscillatory output of said second oscillator circuit and said first alternating current whereby the oscillatory output of said second oscillator circuit modulates said first alternating current so that modulation components will appear in the received radiant energy to simulate an alarm condition.

24. In a motion detection system of the type in which an alternating current is converted into radiant energy which is transmitted throughout an area to be protected and in which a portion of the radiant energy within the area is received and converted into a second alternating current, modulation components in the second alternating current representing motion within the protected area, said modulation components being employed, when present, to provide an alarm indication, the combination comprising a first oscillator circuit for producing said first alternating current, a relaxation oscillator circuit, and means selectively to mix the oscillatory output of said relaxation oscillator circuit and said first alternating current whereby the oscillatory output of said relaxation oscillator circuit modulates said first alternating current so that modulation components will appear in the received radiant energy to simulate an alarm condition.

References Cited in the file of this patent
UNITED STATES PATENTS

| | | |
|---|---|---|
| 2,112,826 | Cook | Apr. 5, 1938 |
| 2,390,221 | Lindsay et al. | Dec. 4, 1945 |
| 2,393,014 | Bartholy | Jan. 14, 1946 |
| 2,655,645 | Bogano | Oct. 13, 1953 |